United States Patent [19]

Kishida

[11] Patent Number: 4,563,707

[45] Date of Patent: Jan. 7, 1986

[54] METHOD AND SYSTEM FOR REGULATING THE MAXIMUM OUTPUT CURRENT OF A PHOTOMULTIPLIER

[75] Inventor: Yoshihiro Kishida, Uji, Japan

[73] Assignee: Dainippon Screen Mfg. Co., Ltd., Kyoto, Japan

[21] Appl. No.: 610,527

[22] Filed: May 15, 1984

[30] Foreign Application Priority Data

Sep. 8, 1983 [JP] Japan ................................ 58-166172

[51] Int. Cl.⁴ ................................................ H04N 1/02

[52] U.S. Cl. ...................................... 358/294; 250/207

[58] Field of Search .................... 250/207, 237 R, 578; 358/282, 294

[56] References Cited

U.S. PATENT DOCUMENTS

| | | | |
|---|---|---|---|
| 2,280,303 | 4/1942 | Reynolds | 358/294 |
| 3,476,940 | 11/1969 | Houser | 250/207 |
| 3,543,095 | 11/1970 | Ensminger et al. | 250/207 |
| 3,765,776 | 10/1973 | Bravenee | 250/207 |
| 4,436,994 | 3/1984 | Van Vliet et al. | 250/207 |

FOREIGN PATENT DOCUMENTS 48-76531 10/1973 Japan .

*Primary Examiner*—Howard W. Britton

*Assistant Examiner*—John K. Peng

*Attorney, Agent, or Firm*—Lowe King Price & Becker

[57] ABSTRACT

By using the initial control voltage or the subsequent control voltage corresponding to the type of the aperture to be set in an input scanning head, the maximum output current of a photomultiplier of an image reproducing system is regulated.

11 Claims, 10 Drawing Figures

FIG.1
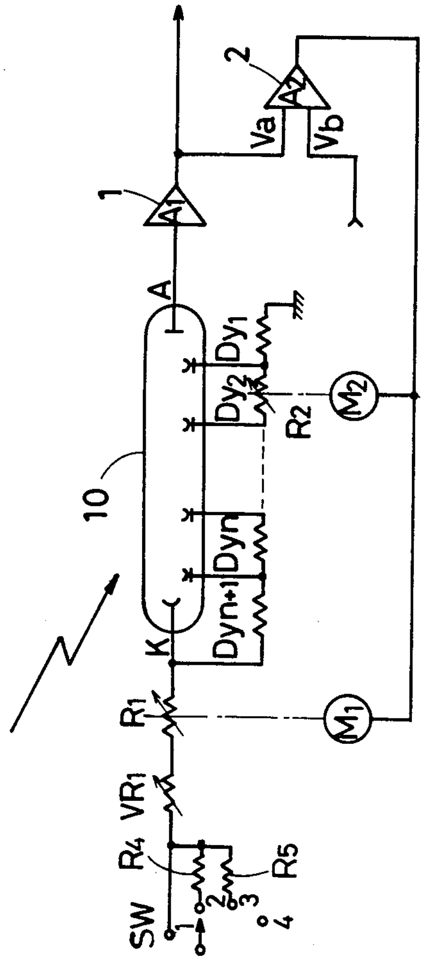
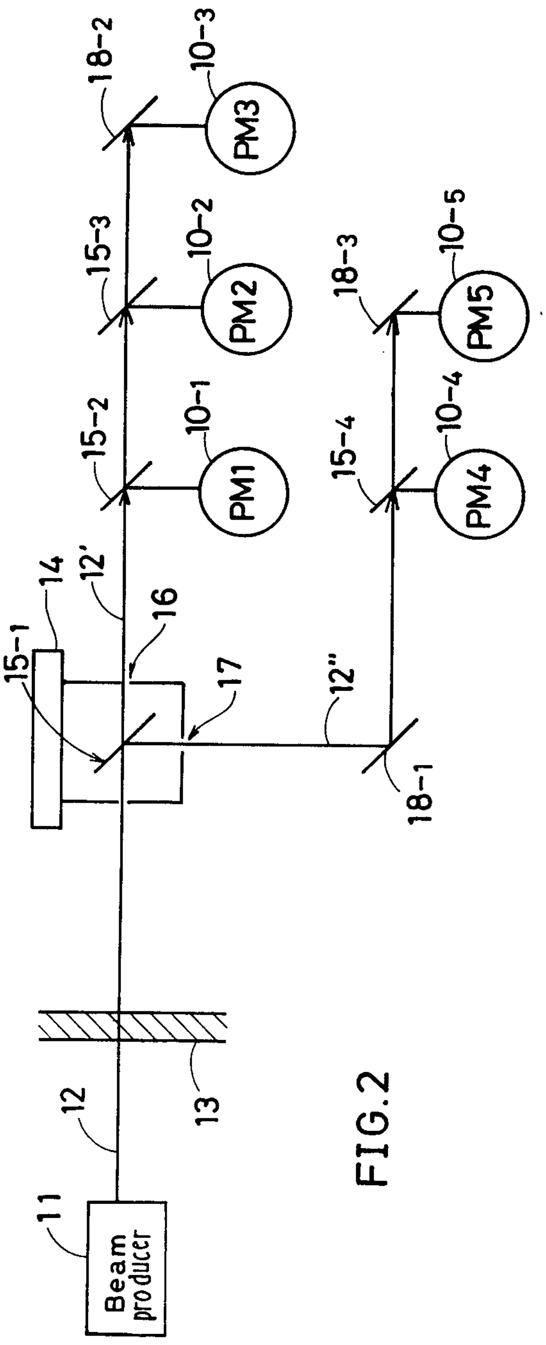
FIG.2

METHOD AND SYSTEM FOR REGULATING THE MAXIMUM OUTPUT CURRENT OF A PHOTOMULTIPLIER

FIELD OF THE INVENTION

This invention relates to a method and system for regulating the maximum output current of a photomultiplier of an image reproducing system.

BACKGROUND OF THE INVENTION

In an image reproducing system, a beam modulated by the density of each portion of an original picture is detected by a photomultiplier as the corresponding variation of the output current thereof and is input to an analog color computation device as a density signal after undergoing current-voltage conversion.

In the above situation, the reference voltage of the color computation device is rendered to correspond to the white level signal from the photomultiplier. While the maximum incident quantity of the input scanning beam being introduced to the photomultiplier varies according to the size of the pickup area to be scanned or the type (size) of the optical aperture to be used for performing detail adjustment (the aperture is built in a cartridge type aperture box). Therefore, in order to compensate the variation, the sensitivity of the photomultiplier must be adjusted in each case, which work is called a "basic calibration".

Conventionally, the basic calibration is performed by using a servo mechanism as shown in FIG. 1. That is, at first the anode current of the photomultiplier 10 is converted into the corresponding voltage $V_a$ in an I/V converter 1. Secondly, the output voltage $V_a$ and the reference voltage $V_b$ of the color computation device are input to a differential amplifier 2. Then according to the output of the differential amplifier 2, a cathode resistor $R_1$ (a potentiometer) or one of dynode resistors $D_{y1}$ to $D_{yn+1}$ (usually the second resister $R_2$ (a potentiometer)) is adjusted by a servo-motor $M_1$ (for the resistor $R_1$) or $M_2$ (for the resistor $R_2$). However as the resistors $R_1$ and R hd 2 are potentiometers, the variable range of each of them is comparatively narrow, which means they can be adjusted only in a limited range. Therefore, a variable resistor $VR_1$ and a resistor selector composed of a switch $SW_1$ and resistors $R_4$ and $R_5$ are added to the cathode resistor $R_1$, thereby rough adjustment is performed by the resister selector and the variable resister $VR_1$, and minute adjustement is performed by the resistors $R_1$ or $R_2$. However this kind of system has too many parts to be adjusted, which also leads to a troublesome handling.

Furthermore, there are employed usually four to six photomultipliers in a color scanner for reproducing plural kinds of color separation films, and said basic calibration work must be carried out on all the photomultipliers for render them to have the same sensitivity. In this case, since they must have the same sensitivity under a specific condition (for example, the condition in which an aperture of a certain size is used and the resistor $R_4$ is selected), sometimes the difference of sensitivity between the photomultipliers cannot be compensated by said servo system alone when the difference exceeds the controllable range of the system. So, in order to overcome the above drawback, photomultipliers of the same sensitivity characteristic are preferable for that use, however, pursuit of which also ends in inefficient yield and consequent high cost of producing photomultipliers.

On the other hand, if said aperture box is pulled out from the head leaving the high voltage be applied to the cathode of the photomultiplier, an intense beam rushing into the photomultipliers destroys it. So to avoid the trouble, an operator must cut off the cathode voltage before pulling out the aperture box from the head. Providing an OFF terminal 4 to the switch $SW_1$ and thereby selecting the terminal is a resolution to the problem indeed, however which becomes meaningless when neglected.

In addition, a system thus constructed comprises a certain number of mechanical contact points in such as the switch, the variable resistors and the servo potentiometers. And as the contact points are usually given a negative potential of several hundred of volts, static electricity charged on them easily attracts dusts, which also causes troubles. Moreover the servo potentiometer has a structure that the revolution shaft of a potentiometer is revolved by a small servo motor, and it sometimes snaps or goes wrong. And in a color scanner, every photomultiplier needs at least one servo potentiometer(s), which pushes up the cost of the scanner system.

SUMMARY OF THE INVENTION

The first object of this invention is to perform a calibration work using no potentiometer.

The second object is to automatically regulate the output current of a photomultiplier according to the type (size) of the aperture to be used securely in a short time.

The third object is to prevent the photomultiplier from being destroyed by an intense beam which rushes into the photomultiplier when the aperture (box) is pulled out from an input scanning head by cutting off the cathode voltage thereof.

To realize the above objects, at first by detecting whether the aperture (box) to be used is set or not in the input scanning head, a switch for controlling the cathode voltage of the photomultiplier is turned on or off; secondly when the aperture (box) is set in the head, the corresponding initial control voltage for controlling the cathode voltage of the photomultiplier is obtained; then by controlling the cathode voltage with the control signal, the maximum output current of the photomultiplier is regulated.

The above and other objects and features of this invention can be appreciated more fully from the following detailed description when read with reference to the accompanying drawings.

BRIEF DESCRIPTION OF THE DRAWINGS

FIG. 1 shows a conventional circuit for performing a basic calibration.

FIG. 2 shows an optical system of the input side of a conventional scanner.

PREFERRED EMBODIMENT OF THE INVENTION

Figure 3A:
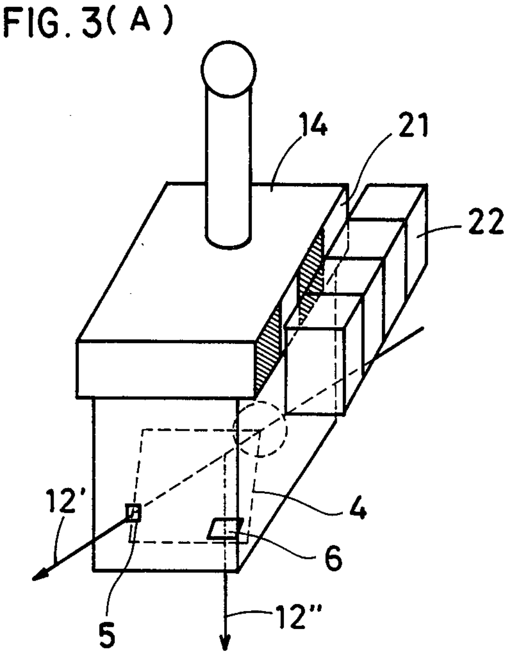
FIGS. 3A, 3B, 3C, 3D and 3E show the function of a beam sensor for discriminating the type (size) of the aperture to be used.

FIG. 2 shows an optical system of the input side of a conventional scanner, while FIG. 3 shows the function of a beam sensor for discriminating the type (size) of the aperture to be used.

A beam 12 output from a beam producer 11 passes through an original picture placed on an input scanning drum 13 and divergers into two courses by the operation of a half mirror $15_{-1}$. One of the divergence beams passes through an aperture 16 to be a rectified beam 12', while the other passes through an aperture 17 to be another rectified beam 12".

Figure 3B:
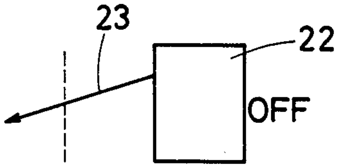
Figure 3C:
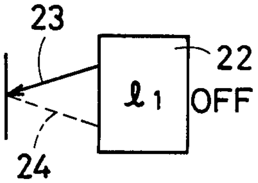
Figure 3D:
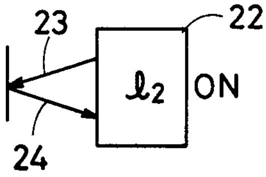

A cartridge type aperture box 14 comprising the half mirror $15_{-1}$ and the apertures 16 and 17 are made to be put into or taken off from an input scanning head at need. And an aperture type discrimination board 21 is attached to a temporal part of the aperture box 14. The aperture type discrimination board 21 is made to face against a reflection beam sensor 22 attached to the input scanning head when the aperture box 14 is set in the head. The sensor 22 has two functions, one of which is to detect whether an aperture (box) to be used is set in the input scanning head or not, and the other is to discriminate the type (size) of the aperture being set in the head according to the pattern of the aperture type discrimination board 21. That is, when no aperture (box) is set in the input scanning head, a detection beam 23 emitted from each element of the sensor 22 does not get back thereto as shown in FIG. 3(B) because there is no reflective object in front, which means the output signal of every element of the sensor 22 indicates the logic level "L" (low level). When an aperture (box) to be used is set in the input scanning head, any element which receives the reflected beam 24 from a black portion of the board 22 as shown in FIG. 3 (C) outputs the "L" signal, while any elements which receives the reflected beam 24 from a white (or a mirror) portion as shown in FIG. 3 (D) outputs the "H" (high level) signal. Therefore, the type (size) of the aperture to be used can be detected by a combination of the signals "H" and "L" output from the elements of the sensor 22.

Figure 3E:
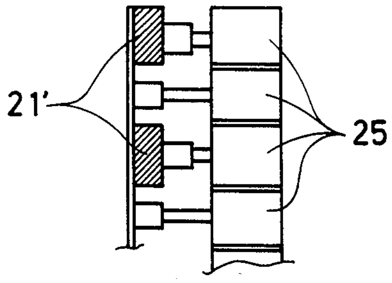

The reflection beam sensor 22 can be replaced with micro switches 25 as shown in FIG. 3(E). In this case, the aperture box 14 must have a discrimination board 21' consisting of several prominent and flat elememts. So, when no aperture box is set in the input scanning head, all the micro switches 25 output "OFF" signals. When an aperture (box) to be used is set in the head, the prominent elements push the rods of their front micro switches to make the output signal thereof "ON", while the flat elements have no effect on their front micro switches to make the output signal thereof "OFF". Therefore, the type (size) of the aperture (box) set in the head can be detected by a combination of the "ON" and "OFF" signals from the micro switches 25.

Figure 4:
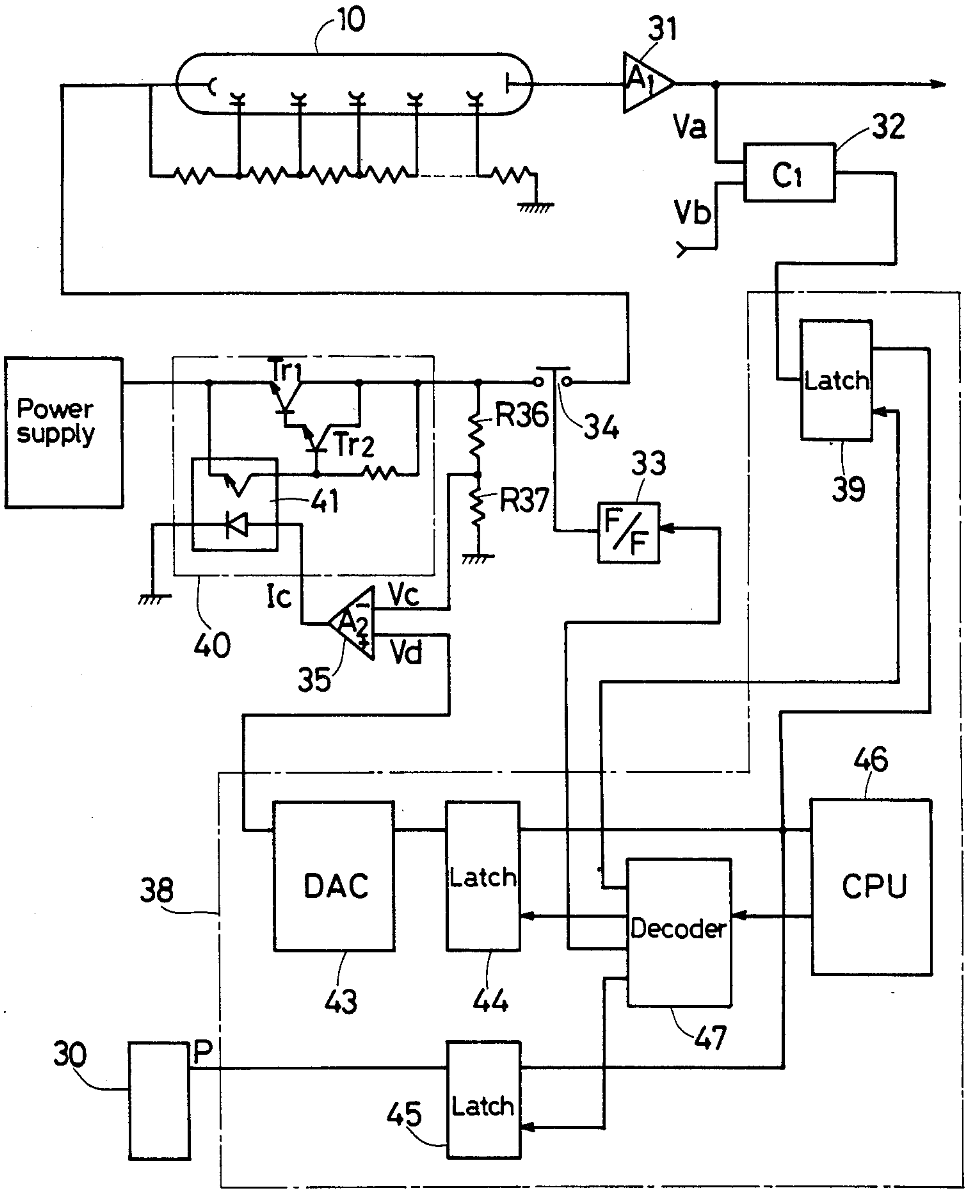
FIG. 4 shows an embodiment of the method of this invention.

FIG. 4 shows an embodiment of the method of this invention. In FIG. 4, at first an aperture box detection sensor 30 (the reflection beam sensor 22 or the micro switches 25 shown in FIG. 3) detects that an aperture (box) is set in the input scanning head. According to the type (size) of the aperture (box), the corresponding detection signal P is input to a cathode voltage control circuit 38. The circuit 38 renders a flip-flop circuit 33 operate on command of the detection signal P. And the output of the flip-flop circuit 33 makes a relay 34 on to apply a voltage to the cathode of a photomultiplier 10.

When no aperture box is set in the head, of course no detection signal is output from the sensor or the micro switches. Therefore the relay 34 is turned off to cut off the cathode voltage of the photomultiplier 10.

When the relay 34 is turned on, the initial cathode voltage $V_d$ is input to a differential amplifier 35 according to the type (size) of the aperture. In this, each aperture type corresponds to a specific voltage $V_d$, which is already memorized in an internal register of a CPU 46.

On the other hand, the anode current of the photomultiplier 10, which is given a cathode voltage corresponding to the type of the aperture to be used, undergoes current-voltage conversion in a current/voltage converter 31 and is input to a color computation device (not shown in Drawings) as well as to a comparater 32 as a voltage signal $V_a$. The comparator 32 compares the voltage $V_a$ . The comparator 32 compares the voltage $V_a$ to the reference voltage $V_b$ being input from the color computation device (not shown in Drawings). When $V_a > V_b$, the comparator 32 outputs the "H" signal. When $V_a < V_b$, it outputs the "L" signal. When the difference value between both voltages $V_a$ and $V_b$ is within a permissible range, the comparator 32 outputs the "0" (zero level) signal. The three level signal is input via a latch 39 to the cathode voltage control circuit 38.

In this construction, the cathode voltage control circuit 38 produces the initial or the subsequent control voltage $V_d$ as in the following manner. That is, when the output of the comparator 32 is "H", the difference between the voltage $V_d$ and a voltage $V_c$ obtained by dividing the cathode voltage (both voltages are input to a difference voltage amplifier 35) is rendered to be reduced by the operation of the CPU 46 (detailed later). Then the output current $I_c$ of the difference voltage amplifier 35 is reduced. Consequently, the cathode current of the photomultiplier 10 is reduced by a cathode current regulator 40. When the output of the comparator 32 is "L", the difference between the voltage $V_d$ and the voltage $V_c$ is rendered to be increased by the operation of the CPU 46. Then the output current $I_c$ of the difference voltage amplifier 35 is increased. Consequently, the cathode current of the photomultiplier 10 is increased. If the difference between the voltage $V_a$ and $V_b$ is "0" or within a permissible range, no calibration work is carried out. The cathode current regulator 40 of this embodiment comprises a current amplifier consisting of two transistors $T_{r1}$ and $T_{r2}$ (composing a darlington transistor) and a photo coupler 41 which controls the base current of the transistor $T_{r2}$ by the current $I_c$ thereof as shown in FIG. 4.

Figure 5:
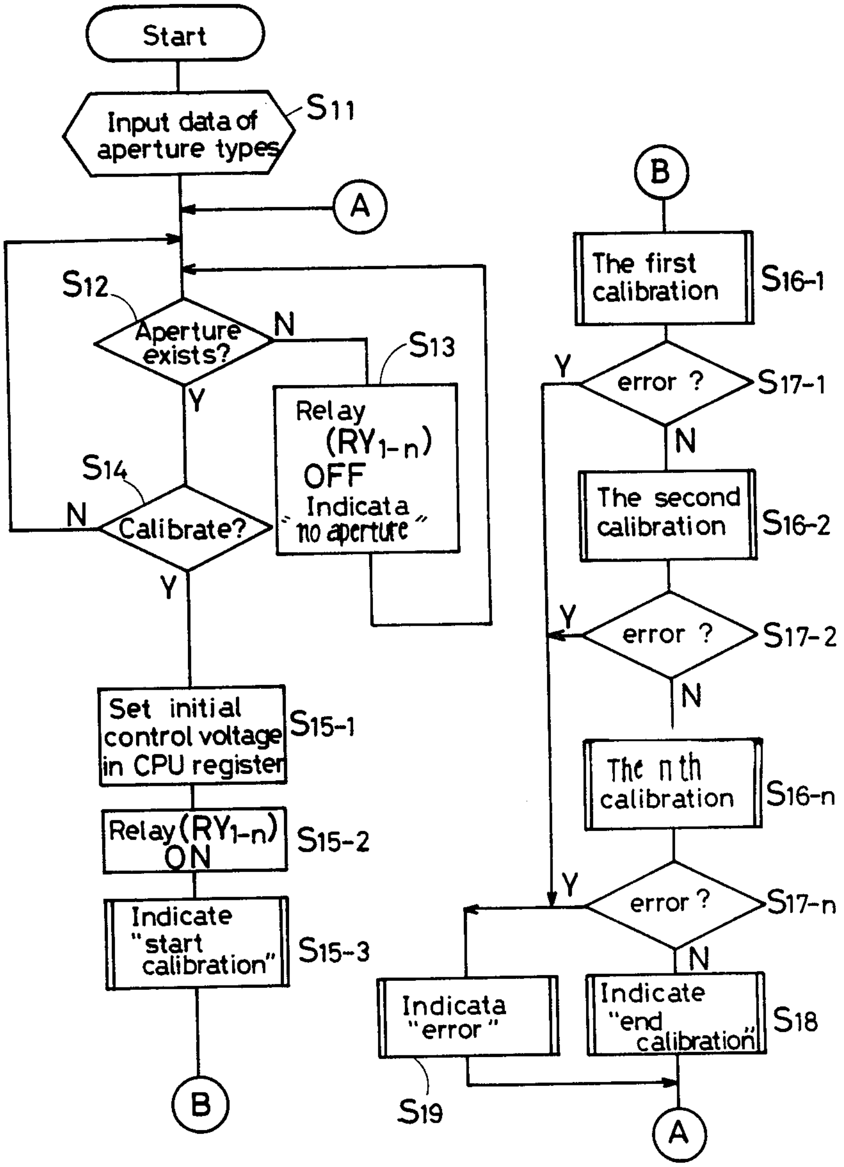
FIG. 5 shows the flow chart of the operation of a CPU.

In FIG. 4, the CPU 46 manages the cathode voltage control circuit 38. The followig mentions the detail of the cathode voltage control circuit 38 based on the flow charts shown in FIGS. 5 and 6.

At first, data of aperture types (sizes) and the corresponding voltage data are input to the CPU 46 ---($S_{11}$). Secondly the CPU 46 judges whether the detection signal P informed with the type (size) of an aperture is output or not --- ($S_{12}$). When no detection signal P is output, the CPU 46 makes the relay 34 off and indicates an error sign of "no aperture is set in the input scanning head" on an external display --- ($S_{13}$). When the detection signal P is output, the CPU is given a sign to carry out the calibration work from an operator ---($S_{14}$). By decoding the detection pulse P, the CPU 46 sets data of the initial control voltage $V_d$ in the internal register thereof, makes the relay on, and displays the start of the calibration process on the external display --- ($S_{15\text{-}1}$, $S_{15-2}$, $S_{15-3}$). Then the CPU 46 carries out the calibration process on every photomultiplier successively --- ($S_{16-1}$. . . $S_{16-n}$), and at last displays the end of the calibration process. When an error (mentioned later) takes place in the calibration process --- ($S_{17-1}$. . . $S_{17-n}$), the CPU displays an error sign on the external display --- ($S_{19}$), and makes the routine get back to the step 12. When the aperture is pulled out from the input scanning head --- ($S_{12}$: NO), the CPU 46 makes the relay off --- ($S_{13}$). This subroutine is repeated untill another aperture is set in the head.

Figure 6:
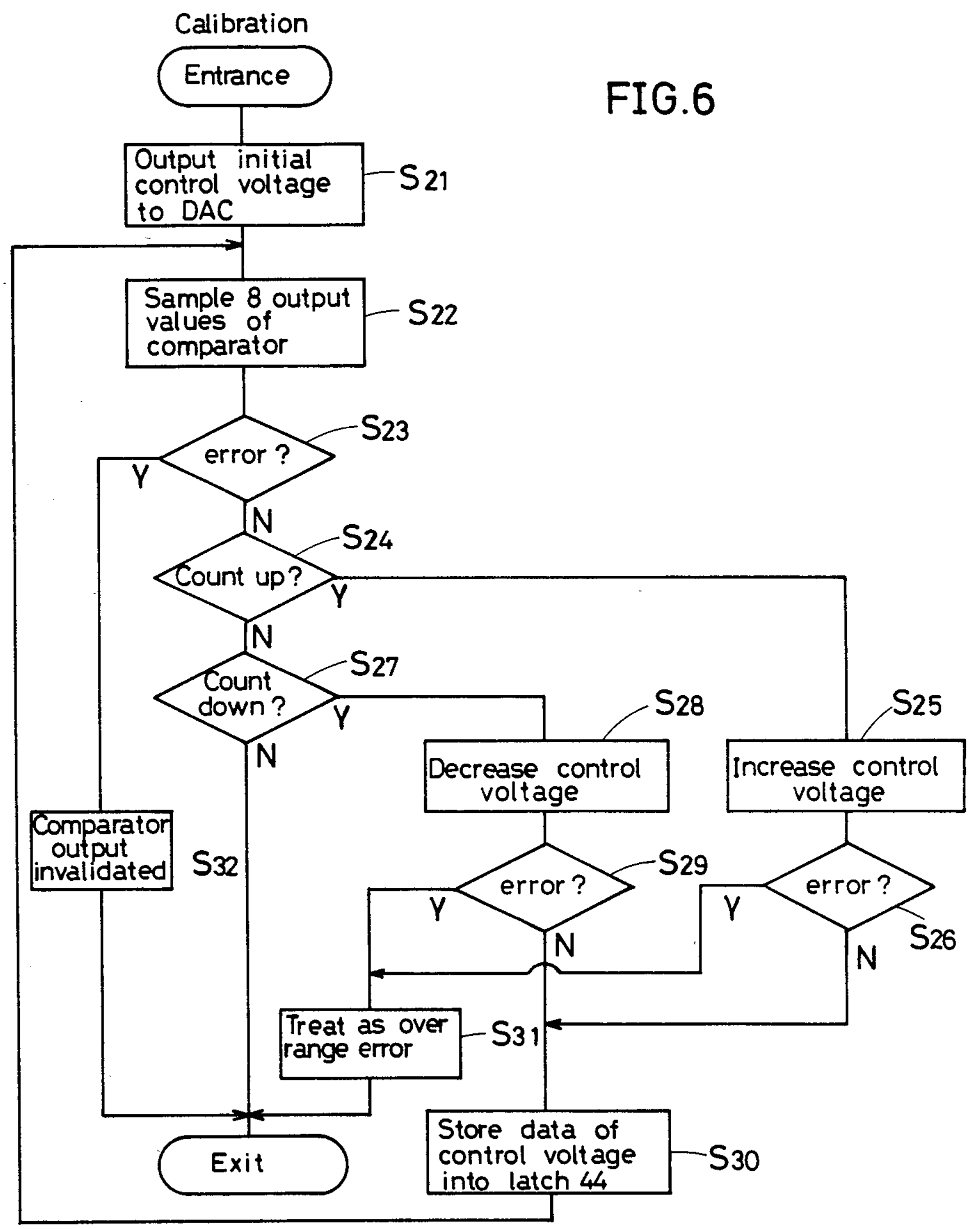
FIG. 6 shows a detailed flow chart of the calibration process shown in FIG. 5.

FIG. 6 shows the detail of the calibration process. That is, the data of the initial control voltage $V_d$ stored in the register in the step $S_{15-1}$ are input via a latch 44 to a D/A converter (DAC) 43 --- ($S_{21}$). Then by sampling the output of the comparator 32 multiple times (for example, eight times) via a latch 39, the CPU 46 takes an average from them (concretely, adopting the major value) to get rid of the influence of noise and so forth --- ($S_{22}$). For example, when more than four out of eight samples are "H", the CPU 46 adopts the value "H". According to the adopted value, the CPU 46 judges whether the initial control voltage $V_d$ must be increased or decreased --- ($S_{24}$), ($S_{27}$). However if the comparator 32 outputs an irregular (abnormal) signal to the CPU 46, the CPU 46 indicates an error sign on the external display --- ($S_{23}$).

When the difference between the output voltage $V_a$ of the I/V converter 31 and the reference voltage $V_b$ from the color computation device is more than a specific value, the comparator 32 outputs "H" or "L" signal. Hereupon, when the half of the sampled output signals are "H" and the rest are "L", the CPU 46 displays an error sign on the external desplay. When the difference between both voltages is less than the specific value (within the permissible range), the comparator 32 outputs "0" signal. Therefore, the CPU doesn't carry out the calibration process on the present photomultiplier, and then begins to control another.

The CPU 46 increases or decreases the control voltage $V_d$ according to the output of the comparator 32 ---($S_{25}$),($S_{28}$). When the control voltage $V_d$ goes beyond the controllability of the D/A converter, the CPU indicates an over range error on the external display and stop the calibration process.

When the control voltage $V_d$ is within the controlable range, the CPU output the data of the voltage $V_d$ to a latch 44 once --- ($S_{30}$), and then to the D/A converter 43. This calibration process is continued untill the output voltage $V_a$ of the I/V converter 31 agree with the reference voltage $V_b$ from the color computation device.

In the embodiment shown in FIG. 4, although the cathode voltage of the photomultiplier is cut off by the relay 34 when no aperture (box) is set in the input scanning head, it can be kept applied if the control voltage $V_d$ is reduced to a safety level. Besides, a decoder 47 distributes control signals to the latches 39, 44 and 45 and to the flip-flop circuit 33 by decoding the command signals from the CPU 46.

As is mentioned above, the method of this invention is capable of protecting a photomultiplier from being destroyed by an intense beam which rushes thereinto by cutting off the cathode voltage of the photomultiplier automatically when the aperture (box) being set the input scanning head is pulled out. And by comparing the output voltage of the photomultiplier (initial voltage is provided according to the type (size) of the aperture (box) being set in the head) to a reference voltage from a color computation device, the cathode voltage of the photomultiplier is adjusted, in other words, a basic calibration work is performed. Terefore, as against the conventional servo system, the method of this invention is capable of performing the basic calibration work of wider range without troublesome adjustment works. So, the method of this invention can accept photomultipliers of wide charcteristic variation. In addition, the method of this invention is capable of carrying out the calibration work on plural photomultipliers automatically, which provides a further convenience.

I claim:

1. A method for regulating the maximum output current of a photomultiplier being employed in an input scanning head of an image reproducing system by using a control signal obtained by comparing the output voltage corresponding to the output current of the photomultiplier being exposed to a beam of certain intensity to a reference voltage input from a color computation device included in the image reproducing system, comprising the steps of:

(a) producing the initial control voltage for controlling the cathode voltage of the photomultiplier according to the type of the aperture to be used;

(b) controlling the cathode current of the photomultiplier according to the initial control voltage or the subsequent control voltage; and (c) continuing to renew the control voltage to the extent the difference between the output voltage and the reference voltage becomes zero.

2. A method claimed in claim 1 in which the step (a) comprises the steps of generating a signal corresponding to the type of the aperture, decoding the signal, and producing the initial control voltage according to the decoded signal.

3. A method claimed in claim 1 in which the step (b) comprises the steps of obtaining a control current corresponding to the difference between the initial control voltage or the subsiquent control voltage and a voltage obtained by dividing the cathode voltage, and controlling the cathode current of the photomultiplier.

4. A method claimed in claim 1 in which the step (c.) comprises the steps of generating a signal which indicates high level when the output voltage is higher than the reference voltage, indicates low level when the former is lower than the latter or indicates zero level when the difference between both voltages is within a certian range, and producing the control voltage according to the three level signal.

5. A method claimed in claim 1 comprising steps of beginning to apply a voltage to the cathode of the photomultiplier by detecting that an aperture is set in the input scanning head, and cutting off the cathode voltage by detecting that the aperture being set in the head is pulled out.

6. A system for regulating the maximum output current of a photomultiplier being employed in an input scanning head of an image reproducing system by using a control signal obtained by comparing the output voltage corresponding to the output current of the photomultiplier being exposed to a beam of certain intensity to a reference voltage from a color computation device included in the image reproducing system comprising:

(a) a means for producing the initial control voltage for controlling the cathode current of the photomultiplier according to the type of the aperture to be used;

(b) a means for controlling the cathode current of the photomultiplier according to the initial control voltage or the subsequent control voltage; and (c) a means for continuing to renew the control voltage to the extent the difference between the output voltage and the reference voltage becomes zero.

7. A system claimed in claim 6 in which the means (a) comprises a photo sensor for generating a signal corresponding to the type of the aperture to be used, a device for decoding the signal, and a device for producing the initial control voltage according to the decoded signal.

8. A system claimed in claim 6 in which the means (b) comprises a differential amplifier for outputting a control current for controlling the cathode current of the photomultiplier according to the difference between the initial control voltage or the subsequent control voltage and a voltage obtained by dividing the cathode voltage.

9. A system claimed in claim 6 in which the means (c) comprises a comparator for generating a signal which indicates high level when the output voltage is higher than the reference voltage, indicates low level when the former is lower than the latter or indicates zero level when the difference between both voltages is within a certain range, and a device for producing the control voltage according to the three level signal.

10. A system claimed in claim 6 comprising a photomultiplier protection means for beggining to apply a voltage to the cathode of the photomultiplier by detecting that an aperture is set in the input scanning head, and cutting off the cathode voltage by detecting that the aperture being set in the head is pulled out.

11. A system claimed in claim 10 is which the photomultiplier protection means comprises a flip-flop circuit which becomes the set state when an aperture is set in the input scanning head or becomes the reset state when the aperture being set in the head is pulled out, and a switch which is controlled by the output signal of the flip-flop circuit.

* * * * *